Oct. 4, 1949. C. G. A. ROSEN ET AL 2,483,674
PISTON
Filed Dec. 15, 1945 2 Sheets-Sheet 2
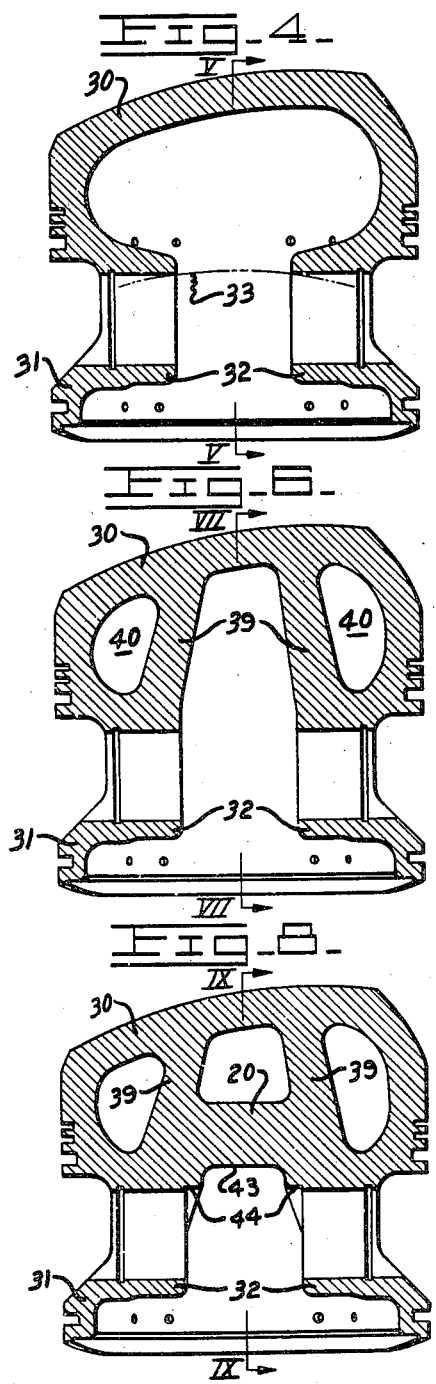
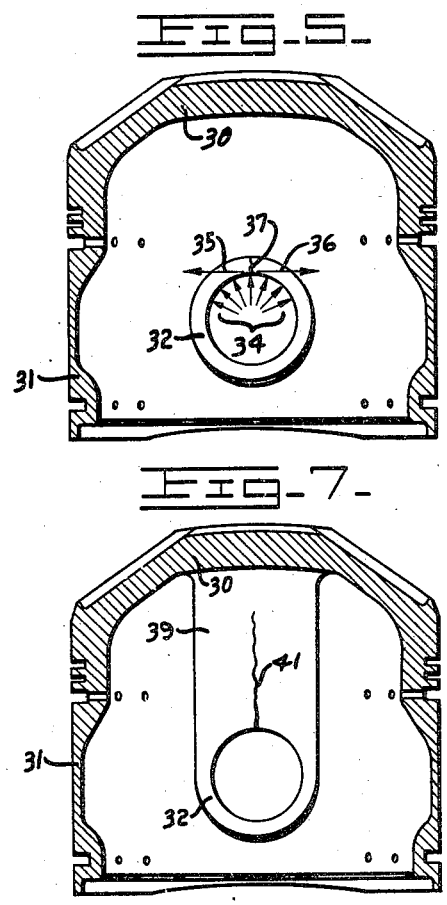
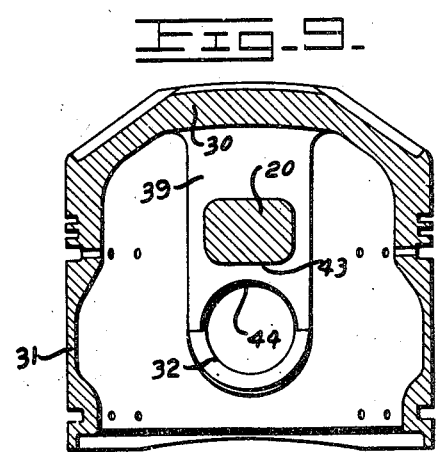
INVENTORS.
CARL G. A. ROSEN
ROLLIN P. VAN ZANDT
BY Charles M. Fryer
ATTORNEY.

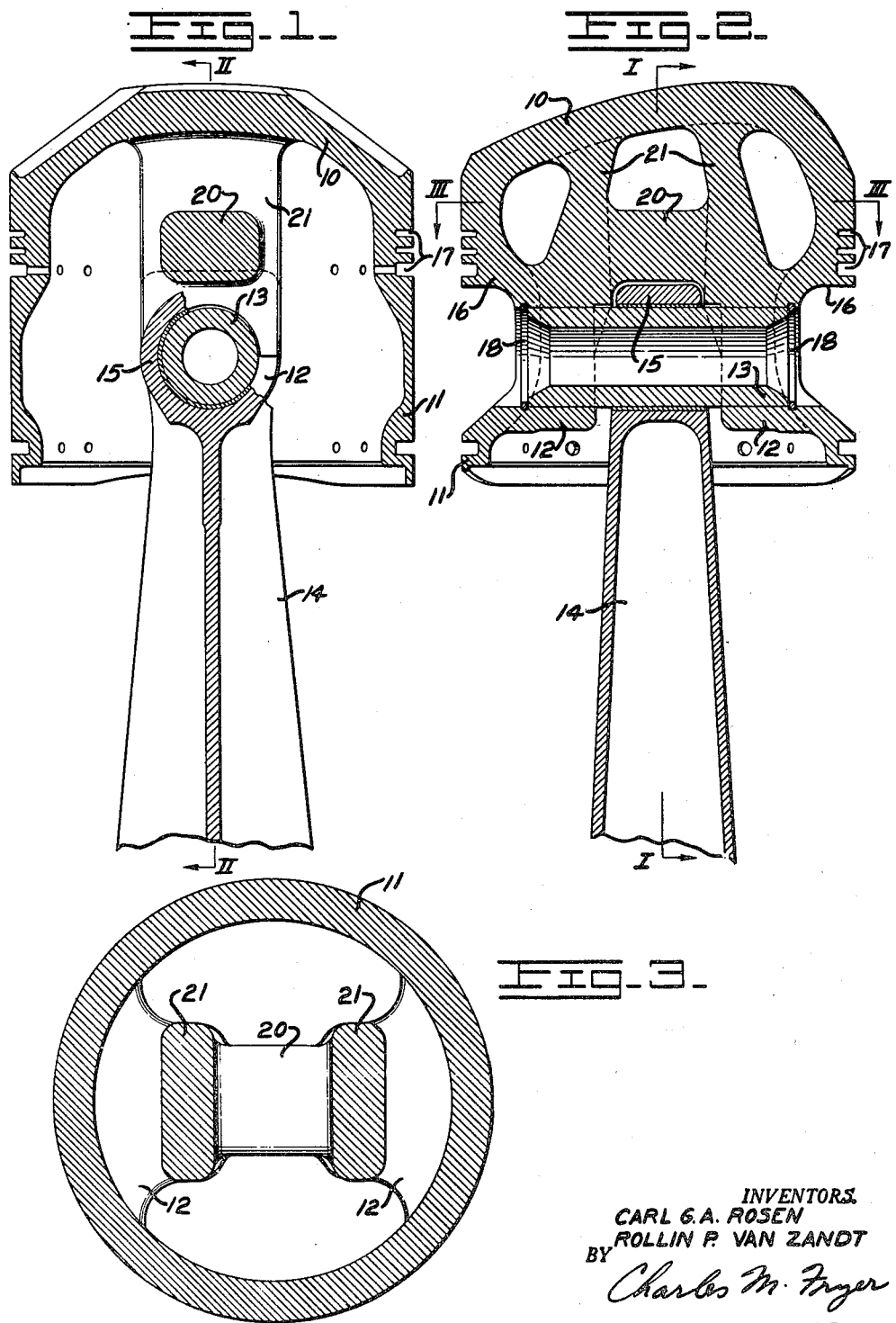

Patented Oct. 4, 1949

2,483,674

UNITED STATES PATENT OFFICE 2,483,674

PISTON

Carl G. A. Rosen and Rollin P. Van Zandt, Peoria, Ill., assignors to Caterpillar Tractor Co., San Leandro, Calif., a corporation of California Application December 15, 1945, Serial No. 635,321

6 Claims. (Cl. 309—19)

The present invention relates to pistons and particularly to pistons for internal combustion engines wherein light weight and strength are desirable and wherein the constantly repeated forces of engine operation are conducive to failure of the metal of which the piston is constructed.

The conventional piston is a hollow cylindrical member closed at one end to provide a head and provided with diametrically opposed inwardly extending bosses for the reception of a wrist pin by means of which the piston is connected with a connecting rod which transmits the reciprocal action of the piston to a crankshaft in a well-known manner. Substantially the entire load of each power stroke of the piston is therefore transmitted through the wrist pin and considerable difficulty has been experienced because of the tendency of the bosses which form the bearings for the wrist pin to fail, or to develop cracks of such magnitude that the usefulness of the piston is impaired or entirely destroyed.

It is an object of the present invention to provide a piston of light weight and of unusual strength and durability. A further object of the invention is the provision of a light weight piston having means to prevent the occurrence of cracks in the metal of which it is formed and including an arrangement or distribution of metal that will retard or prevent the enlargement of cracks which may occur before they attain detrimental dimensions. Still further objects and advantages of the invention are made apparent in the following specification wherein reference is made to the accompanying drawings which illustrate a piston embodying the present invention.

In the drawings:

Fig. 1 is a central vertical section through a piston embodying the present invention and illustrating a portion of a connecting rod connected therewith by means of a wrist pin, the section being taken on the line I—I of Fig. 2;

Fig. 2 is a sectional view taken on the line II—II of Fig. 1;

Fig. 3 is a horizontal sectional view taken on the line III—III of Fig. 2;

Fig. 4 is a diagrammatic view of a conventional piston in cross section corresponding to the section shown in Fig. 2;

Fig. 5 is a diagrammatic view taken on the line V—V of Fig. 4;

Figs. 6 and 7 are diagrammatic views corresponding to Figs. 4 and 5, respectively, showing a similar piston with struts interposed between the wrist pin bosses and the piston head; and Figs. 8 and 9 are similar diagrammatic views showing a piston with similar struts and with a tie bar forming a connection between the wrist pin bosses.

Referring first to Figs. 1, 2 and 3, a piston embodying the present invention is illustrated as having a head 10 and a skirt portion 11. A pair of diametrically opposed wrist pin bosses 12 are formed integrally with the metal of the skirt and extend inwardly of the piston to provide bearings for reception of a wrist pin 13. A connecting rod 14 is shown as having a bearing portion 15 surrounding the central portion of the wrist pin so that reciprocal motion of the piston will be transmitted through the connecting rod to a crankshaft (not shown) to which it is connected in a well known manner.

The piston illustrated in Figs. 1 to 3 inclusive is of a type having a dome-shaped head designed for efficiency in certain types of internal combustion engines. It also has relieved areas 16 in its skirt adjacent the ends of the wrist pin and it is provided with conventional piston ring grooves 17 and snap rings 18 which seat in grooves within the wrist pin bearings to prevent longitudinal movement of the wrist pin. These features of design are, however, not pertinent to the present invention which is generally applicable to pistons of various other designs.

The principal loads in any piston are exerted longitudinally of the piston structure and originate in pressure on the piston head which is transmitted through the wrist pin and the connecting rod to the crankshaft of the engine in which the piston is used. Forces in this direction are opposed by the crankshaft the effect of which is tantamount to forces in the opposite direction and all such forces are borne by the wrist pin bearings and are imposed particularly against one side of such bearings. Referring for convenience to the head of the piston as the upper end thereof and the skirt end as its lower end, it is the upper side of the wrist pin bearing against which the pin bears and which sustains the greater part of the loads referred to. Thus a large proportion of the heavier stresses to which the entire assembly is subjected are concentrated at the upper portions of the wrist pin bosses. Furthermore, because of the fact that the downwardly exerted forces originating above the piston head are borne by the two outer end portions of the wrist pin while the opposing forces are borne centrally thereof at its area of bearing against the connecting rod, there is a tendency toward bending or deflection of the wrist pin so that in operation it may be considered as bowing upwardly at its central portion, and the forces imposed upon the wrist pin bosses are therefore inclined to cause failures of the metal which forms the inner upper ends of the bosses. Consequently, considerable effort has been exerted toward the creation of a piston design with a view to eliminating failure at this point, particularly in a light weight piston.

To this end the present invention provides, as illustrated in Figs. 1, 2 and 3, a connecting member or tie bar shown at 20 and extending between the upper inner ends of the wrist pin bosses 12. The piston shown is also provided with struts 21 which extend from the upper inner portions of the wrist pin bosses to the underside of the piston head 10 as best illustrated in Figs. 1 and 2. The tie bar 20 therefore forms a connection between the struts 21 as well as between the inner ends of the wrist pin bosses though its principal function, as will presently appear, is concerned more with the connection together of the bosses than the connection of the struts 21 which it provides.

Figs. 4 to 9 inclusive of the drawings illustrate a development of the theory of the invention which includes the use of the tie bar 20 and serve to show the manner in which its use prevents piston failure and particularly failure which originates in cracking of the wrist pin bosses. Referring to Figs. 4 and 5, a conventional piston is shown as having a head 30, a skirt portion 31 and wrist pin bosses 32. The tendency to deflect, of the wrist pin which is journaled in the bosses 32, is illustrated in exaggeration by the dotted line 33 which shows that the loads imposed upon the upper inner edges of the wrist pin bosses are increased. As this portion of each of the bosses forms a part of a cylindrical bearing surface, the forces may be assumed to be exerted in the general direction indicated by the arrows 34 in Fig. 5 and are exerted radially outwardly through a substantial portion of the upper part of the wrist pin boss. The components of these forces are such that there is a tensile stress at the upper central portion of the boss, represented by the opposed arrows 35 and 36, which tends to create a failure which is manifested as a crack represented by the line 37. Efforts have been made to overcome this tendency to crack by reinforcement, a common form of which is a strut of the kind illustrated in Figs. 6 and 7 and shown at 39. One such strut was provided between the upper portion of each wrist pin boss and the inner surface of the piston head 30 and in some cases the struts were spaced from the skirt portions of the piston as shown to provide the receses 40, and in other cases these struts were formed as solid metal occupying completely the area between the upper ends of the wrist pin bosses and the piston head. Such struts have been provided with the belief that they would overcome the tendency of the wrist pin to bow or deflect upwardly, as indicated by the line 33 in Fig. 4, by making the wrist pin bosses so rigid that such deflection could not take place. It has been found, however, that such efforts only increase the tendency of the wrist pin bearings to crack so that cracks in the nature of those illustrated in 41 of Fig. 7 develop and extend more rapidly through the added metal which forms the struts 39 than they do where no struts are used. Various modifications in design and arrangement of struts of this kind have been attempted but all have been without satisfactory results and with varying tendencies to crack in the manner illustrated at 41 in Fig. 7. This leads to the conclusion that not only do the struts fail to relieve the undesirable stresses on the wrist pin bosses but that they create a mass of metal in the area which is subjected to failure and, furthermore, this mass of metal is itself so subjected to operational stresses that it is conducive to enlargement or progression of any cracks which originate within it.

In Figs. 8 and 9, a connecting member or tie bar 20 has been interposed between the upper ends of the bosses 32 and it has been found that the presence of this tie bar almost entirely eliminates any tendency of the bosses to crack in the manner illustrated in Figs. 5 and 7 and also provides means for arresting or deterring the progression of any small cracks which may occur after long continued service.

The presence of the tie bar 20 serves to prevent distortion of the piston walls or skirt portion, which is in itself a desirable improvement in the general construction of the piston. The tie bar also serves, in tieing together the wrist pin bosses, to maintain them in alignment with each other as was intended by the provision of the struts 39 as they are illustrated in Fig. 6. By thus maintaining alignment of the bosses, upward deflection of the wrist pin is deterred and its load is more evenly distributed throughout the length of its bearing surface. Furthermore, the tie bar 20 provides a mass of metal under relatively light stresses rather than under the heavy compression stresses to which the struts 39 are subjected. Consequently, any small cracks which may occur at the upper inner edges of the wrist pin bosses extend toward and into this mass of metal which is not subjected to stresses which tend to increase their magnitude, and cracks which have developed in operating tests of pistons constructed in accordance with this invention have remained so small as to have no ill effect on the structure or function of the piston.

It is desirable that the tie bar 20 be positioned as close to the point of origin of the cracks in the upper inner ends of the wrist pin bosses as possible but it must be spaced sufficiently high to accommodate the connecting rod bearing portion 15 as illustrated in Fig. 2. Consequently, the structure illustrated in Figs. 2 and 8 has been resorted to wherein the central portion of the tie bar 20 is relieved, as indicated at 43, to accommodate the connecting rod bearing but wherein the end portions 44 thereof are very close to the bearing surfaces of the wrist pin and may be machined for necessary clearance and to retain as great a mass of metal under no bearing load as possible in close proximity to the point where cracking originates.

While the tie bar 20 is herein illustrated as used in conjunction with struts 39, the struts are not essential to its functioning and may be eliminated with slight variations in structure without sacrificing many of the advantages of the invention as herein described.

We claim:

1. A piston for an internal combustion engine or the like comprising in combination with the usual head, skirt and wrist pin bosses, a tie bar extending between the wrist pin bosses, said tie bar being joined with the bosses closely adjacent to their load bearing areas and presenting a relatively large mass of unstressed metal free of contact with said head and skirt.

2. A piston for an internal combustion engine or the like comprising in combination with the usual head, skirt and wrist pin bosses, a tie bar formed integrally with and extending between the wrist pin bosses and presenting a relatively large mass of unstressed metal free of contact with said head and skirt.

3. A piston for an internal combustion engine or the like comprising in combination with the usual head, skirt and pair of separate spaced wrist pin bosses, a tie bar formed integrally with and extending between the wrist pin bosses and joining said bosses adjacent their load bearing areas but free of contact with the head and skirt of the piston.

4. A piston for an internal combustion engine or the like comprising in combination with the usual head, skirt and wrist pin bosses, a tie bar formed integrally with and extending between the wrist pin bosses and joining said bosses adjacent their load bearing areas to present a mass of metal substantially free of compression stresses in the immediate vicinity of said areas.

5. In a piston which has a head and a skirt portion depending therefrom, a pair of spaced diametrically opposed wrist pin bosses extending inwardly from said skirt portion, strut members interposed between the wrist pin bosses and the head of the piston, and a tie bar spaced from the piston head extending between the wrist pin bosses and presenting a mass of unstressed metal adjacent stressed edges of the bosses.

6. In a piston which has a head and a skirt portion depending therefrom, a pair of diametrically opposed wrist pin bosses extending inwardly from said skirt portion, strut members interposed between the wrist pin bosses and the head of the piston, and a tie bar extending between the wrist pin bosses, said bosses, struts and tie bar being integrally connected and said tie bar being arranged to provide a mass of metal substantially free of compression stresses in the vicinity of the load bearing areas of the wrist pin bosses.

CARL G. A. ROSEN.
ROLLIN P. VAN ZANDT.

REFERENCES CITED

The following references are of record in the file of this patent:

UNITED STATES PATENTS

| Number | Name | Date |
| --- | --- | --- |
| 1,142,177 | Kennedy | June 8, 1915 |
| 1,228,909 | Green | June 5, 1917 |
| 1,554,741 | Lowe | Sept. 22, 1925 |
| 1,554,742 | Lowe | Sept. 22, 1925 |
| 1,557,625 | Stellmann | Oct. 20, 1925 |
| 1,759,110 | Graves | May 20, 1930 |
| 2,387,634 | Anderson | Oct. 23, 1945 |

FOREIGN PATENTS

| Number | Country | Date |
| --- | --- | --- |
| 27,236 | France | Jan. 22, 1924 |